United States Patent [19]

Schegerin

[11] Patent Number: 5,452,516
[45] Date of Patent: Sep. 26, 1995

[54] PROCESS FOR DETERMINING THE POSITION OF A HELMET

[76] Inventor: Robert Schegerin, 4, Chemin Du Vallot, 78350 Jouy-En-Josas, France

[21] Appl. No.: 186,698

[22] Filed: Jan. 25, 1994

[51] Int. Cl.$^6$ ................................................ G01B 5/24
[52] U.S. Cl. .................... 33/1 MP; 33/512; 356/139.03
[58] Field of Search ................... 33/1 MP, 2 R, 33/712, 511, 512, 516, 732, 733, 754; 250/225; 356/139, 140, 16, 426, 139.03, 139.04, 141.5; 74/89, 26

[56] References Cited

U.S. PATENT DOCUMENTS

| | | | |
|---|---|---|---|
| 4,062,247 | 12/1977 | Brown et al. | 74/89 |
| 4,691,446 | 9/1987 | Pitches et al. | 33/1 MP |
| 4,792,697 | 12/1988 | Le Parquier et al. | 356/139.03 |
| 5,059,789 | 10/1991 | Salcudean | 356/139.03 |
| 5,085,507 | 2/1992 | Williams | 356/139.03 |
| 5,208,641 | 5/1993 | Mocker et al. | 356/139.03 |

FOREIGN PATENT DOCUMENTS

| | | | |
|---|---|---|---|
| 2080520 | 2/1982 | United Kingdom | 356/139.03 |
| 2157426 | 10/1985 | United Kingdom | 356/139.03 |

*Primary Examiner*—Christopher W. Fulton
*Attorney, Agent, or Firm*—Larson & Taylor

[57] ABSTRACT

Helmet positioning measurement system enabling the determination of the position in space of a helmet by measuring at least three distances (D1, D2, D3..) between at least three points located on the helmet (C1, C2, C3...) and three corresponding points (S1, S2, S3...) located on the seat or the cabin, these said points being placed in such a way that it is possible to compute at least two position parameters θ and α with a great precision using the following univocal relations:

$$\theta = f_\alpha(D1, D2, D3, \ldots) \text{ and } \alpha = f_\alpha(D1, D2, D3, \ldots)$$

This system can be used in the aeronautical field, in the car racing field, during tests, where it is important to know the displacement of a human or mannequin head movement.

9 Claims, 2 Drawing Sheets

PROCESS FOR DETERMINING THE POSITION OF A HELMET

BACKGROUND OF THE INVENTION AND PRIOR ART

This invention is relative to the determination of the parameters used to establish with great precision the position of a head gear relative to a cockpit or a seat, while leaving the head completely free to move without creating any significant forces even under high accelerations (high "g" load).

This invention can lead to the development of numerous applications such as in racing cars, tests with mannequins, and on aircraft. This invention can improve significantly the performances of optronic systems such as visual-visor helmet mounted sight or virtual reality visors where the required precision is important.

The current existing systems are heavy, expensive, complex and inaccurate.

The French patent no. 2 672 565 describes a process using an articulated arm composed of articulated segments which include a means to measure the relative position of each segment. In order to obtain a system enabling all possible movements of the head, it is necessary in this case to use a succession of segments (being the structure of the articulated arm and including precise means of measuring the position in space of each segment). This leads to a very complex and expensive system. The mass of this articulated arm creates unacceptable forces under "g" load and especially during front/aft acceleration.

The U.S. Pat. No. 4,062,247 proposes a system connecting the helmet with one point of the cabin. Several means of angle measurements are necessary. The unwinding of two or three bands do not allow, pursuant to this invention, the measurement of neither a length, nor a difference of length. It enables the arm to have a structural rigidity in order to permit the possibility to measure the angle of rotation around the axis 33, 31 23a and 27 of FIG. 1 of this American patent. This system has necessarily a non negligible mass, due to the required rigidity of the band. This mass does create unacceptable forces during "g" loads.

The U.S. Pat. No. 3,867,629 proposes a process enabling the rotation measurement of a solid by using a special polarized surface and complex optronic system. This system requires the usage of sophisticated expensive, unreliable, heavy an inaccurate equipment.

The U.S. Pat. No. 3,917,412 describes a process enabling the measurement of the rotation of the helmet knowing the direction of the emitting sources E1 and E2 from two detectors D1 and D2. This method enables to find the angles positioning the helmet from the angle values. This method necessitates the use of sophisticated technologies that are heavy, expensive, not reliable, and not precise.

The French patent no. 2 433 760 presents an optronical system defining the angular position of a helmet taking into account the local angular position of three points forming a triangle. This system requires sophisticated optical systems which are heavy, complex and expensive.

The French patent no. 2 404 860 presents a system enabling the measurement of the distance of a surface furnishing a diffuse reflection and comprising a light emitting source furnishing a fine beam light, and comprising a beam deviation means in order to create a cycling movement and a light detector. This method requires the usage of sophisticated technologies leading to a high mass, high cost, low reliability, low precision system.

The French patent no. 2 450 463 presents an optical system localising a beam and measuring the direction of this emitting source. Here again the direct measurement of the angles leads to heavy, complex, expensive and inaccurate system.

The French patents no. 2 664 044 and 2 665 415 present a magnetic system incorporated in the helmet and modifying the electro-magnetic field of the cabin according to the position of the helmet. But these systems are very difficult to operate. They are also expensive, heavy, not precise and sensitive to external magnetic fields.

The British patent no. 2 143 948 presents a system comprising a gyroscopic device integrating the accelerations of the helmet and computing the corresponding movements. This system is heavy and expensive and increases the mass of the helmet.

The British patent no. 1 520 154 presents a system determining the position of the helmet comprising at least three points emitting radiation and a fixed part detecting the angular position of these points. This system requires the use of sophisticated technologies which are expensive, unreliable, and not precise.

SUMMARY OF THE INVENTION

One object of the invention is to provide a process and an installation enabling the determination of the position of a helmet with a better precision than what is currently practically obtained today, (the angles of rotation of the helmet being known with a precision better than one milliradian), without using rigid structural elements linking the helmet to the cabin and without using expensive optronical systems and without using any electro-magnetic means.

The word "helmet" is used in the wide and broad sense comprising about the neck head mounted systems, earphones, . . . etc.

The word "Pitch angle $\theta$" is used to define the rotation of the helmet around the axis which is perpendicular to helmet plan of symmetry.

The word "yaw angle $\alpha$" is used to define the rotation of the helmet around an axis parallel to the vertebral column (see FIG. 2).

The words "fixed structure, or cabin" are used to define the fixed coordinate system being used to define the head movements, as of for example an aircraft cockpit, a seat, a car cockpit . . . etc.

The word "univocal relation" is used to define a one to one relation between two parameters A and B such as for a value of A, there is only one corresponding value of B and reciprocally.

Pursuant to the primary roles of this invention, what is proposed is a process and a system enabling the precise measurement, in real time, of the position of a helmet placed on the head of a person, while the helmet is moving relatively to a fixed structure and without adding practically any weight to the helmet, and without modifying the inertia of the helmet and without linking the helmet to the fixed structure by any rigid element, and without creating any force on the helmet which could be detrimental to the pilot performance and comfort.

These goals are achieved pursuant to the invention, essentially by measuring at least three distances (D1, D2, D3 . .

.) existing between at least three points (C1, C2, C3, ...) of the helmet and at least three corresponding points (S1, S2, S3, ...) located on the fixed structure, in such a way that at least the two univocal relations:

$$\theta = f_\theta(D1, D2, D3, \ldots) \text{ and } \alpha = f_\alpha(D1, D2, D3, \ldots)$$

give, with a great precision (better than the milliradian) at least the pitch angle $\theta$ and the yaw angle $\alpha$ from the measured distance (D1, D2, D3, ...).

Pursuant to an advantageous way according to the invention, it is possible to simplify the univocal relation defining the angles and form two particular univocal relations:

$$\theta = f_\theta[D1, (D2+D3)] \text{ and } \alpha = f_\alpha[D1, (D2-D3)]$$

It is possible following an advantageous way pursuant to the invention to use another couple of points C4 and S4 in order to increase the precision of the measurements of $\theta$ and $\alpha$ or to find out another coordinate defining the position in space of the helmet, for example the angle of rotation of the helmet in roll or the lateral distances. It is to be noted that to obtain all six coordinates defining completely the position of any solid in space, it is necessary to measure six distances between the points C1 to C6 located on the solid and the six corresponding points located on the cabin or seat. To obtain 4, 5 or 6 coordinates defining the position of the helmet in space, it is necessary to measure 4, 5 or 6 distances, respectively, between the points C located on the helmet and the corresponding points S located on the cockpit or seat. For example the two univocal relations are $$\theta = f_\theta(D1, D2, D3, D4) \text{ and } \alpha = f_\alpha(D1, D2, D3, D4)$$

One practical way to measure the distances between the points C located on the helmet and the points S located on the cockpit or seat is to place fine flexible wires between the points C and S in such a way that each wire gives a length information without creating any significant forces on the helmet (less than about one Newton).

Pursuant to one advantageous way, one end of the wire is fixed on the helmet at point C and the other end is rolled around a pulley having its axis of rotation fixed in relation with the seat or the cockpit, and comprising a means of measuring its rotation angle. All rotation information can be transmitted to a computer and by using the univocal relation defined above, the computer calculates the useful coordinates such as for example the angles of rotation of the helmet $\theta$ and $\alpha$. These values can, then, be used by the visor system computer, the head mounted visor/visual system or be transmitted to the pilot. It is advantageous to create a light pulling force on the wires to insure a slight tension on the wires in order to maintain a straight line between the points C and S and to improve the pilot comfort. Since generally the head has a tendency to fall forward, applying a slight force towards the head rest can be beneficial to the head stability and the comfort, especially if the applied force varies as a function of the acceleration ("g" load). This tension means can be obtained by a spring, an electrical system or a mass hanging from pulley and attached to the end of the wires. In this case the pulling force will vary according to the "g" load.

In order to ensure a rapid and safe disconnection between the person and the seat, it is advantageous to place a disconnection means such as press studs or snap fasteners on the helmet. It is also advantageous to use a wire having a resistance not exceeding a set limit to ensure the man/seat separation during the ejection sequence. It is also advantageous to wind a preset length of wire around the pulley, for example 5 feet. In this case during man/seat separation, the wire will naturally be unwounded to the end and will ensure the safe disconnection between the helmet and the seat.

The invention will be better understood by reading the following description of one particular application of the invention given here as an example.

BRIEF DESCRIPTION OF THE DRAWING

These and other objects and advantages of the invention will be apparent upon reading the following description in conjunction with the drawings.

DESCRIPTION OF A PREFERRED EMBODIMENT

Figure 4:
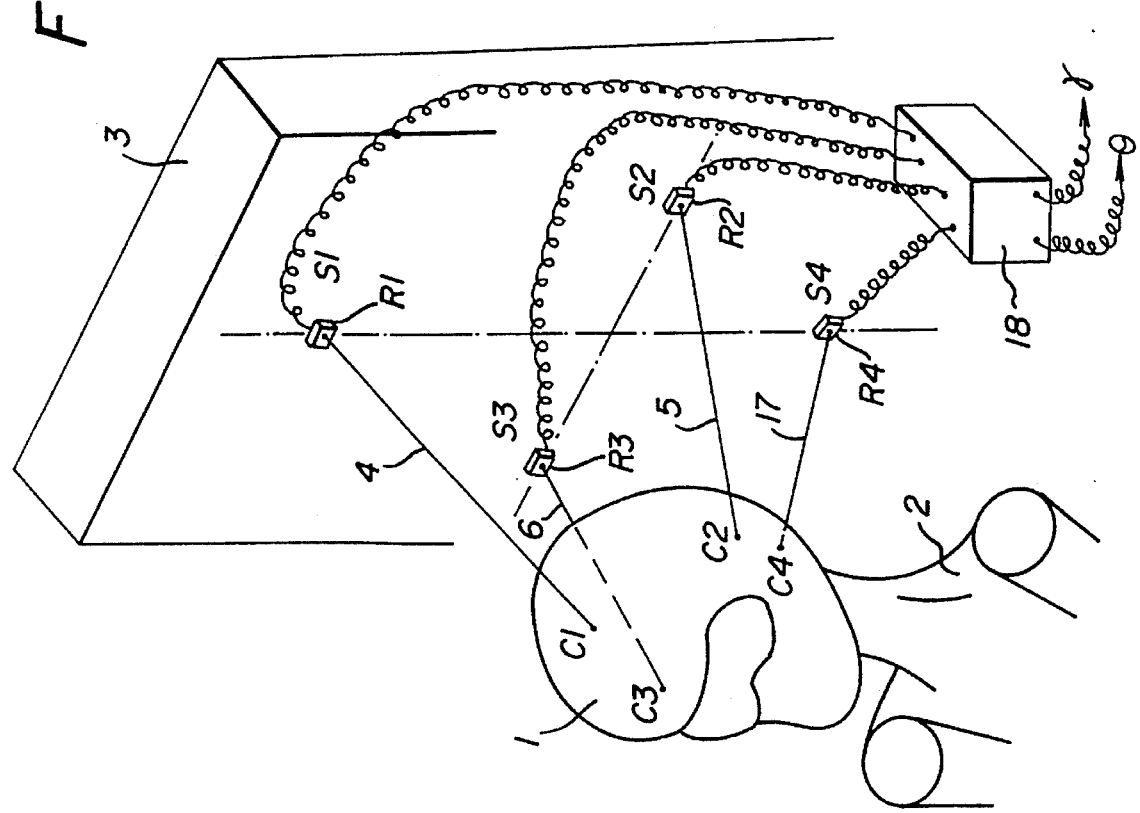
FIG. 4 is a schematic of a person wearing a helmet and sitting on a seat showing how the wires can be wound up around the pulley and how a spring or a mass can insure the required tension.

As shown on FIG. 4, a person 2 seating on a seat 3 is wearing a helmet 1. The point C1 is placed, in this case, on the top of the helmet, while the points C2 and C3 are placed on both sides of the helmet. Points S1, S2 and S3 are placed on the head rest at the same level of the points C1, C2 and C3.

Three fine and flexible wires 4, 5 and 6 are placed respectively between points C1 and S1, C2 and S2, and C3 and S3. Each wire is wound around a pulley turning around an axis that is fixed in relation with the seat. FIG. 4 shows three pulleys placed at points S1, S2 and S3. Each pulley is connected to a rotary encoder (10, 11, 12) measuring the rotation of the pulley. Springs 13, 14 and 15 insure the required wire tensions. Each rotary encoder sends an electrical signal to the computer 16. This computer analyzes the input signals and using a predetermining univocal relation, computes the values in real time of the required parameters. In this case, it is possible to obtain the pitch angle, the yaw angle and the distance DX between the helmet and the head rest using the following relations:

$$\theta = f\frac{[D1 - (D2 + D3)]}{2}$$

$$\gamma = f(D2 - D3)$$

$$DX = \frac{[D1, (D2 + D3)]}{2}$$

Figure 1:
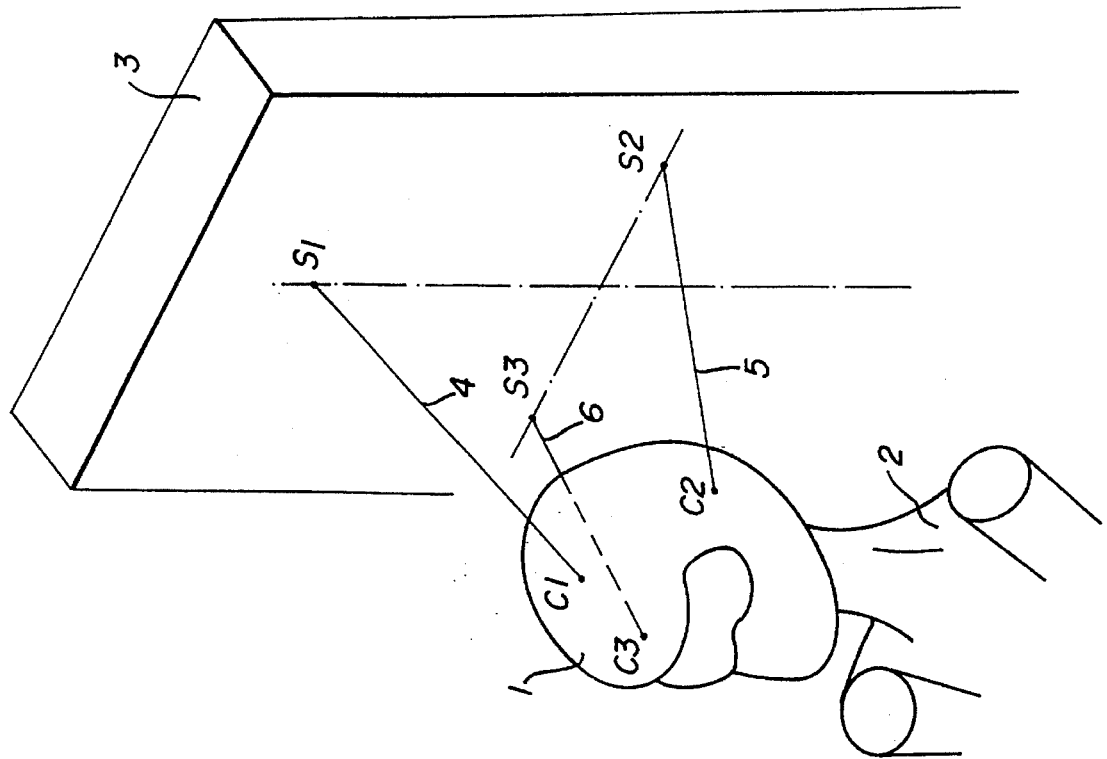
FIG. 1 is a schematic representing a person wearing a helmet and sitting on a seat showing the three points C located on the helmet and the three points S located on the seat.
Figure 2:
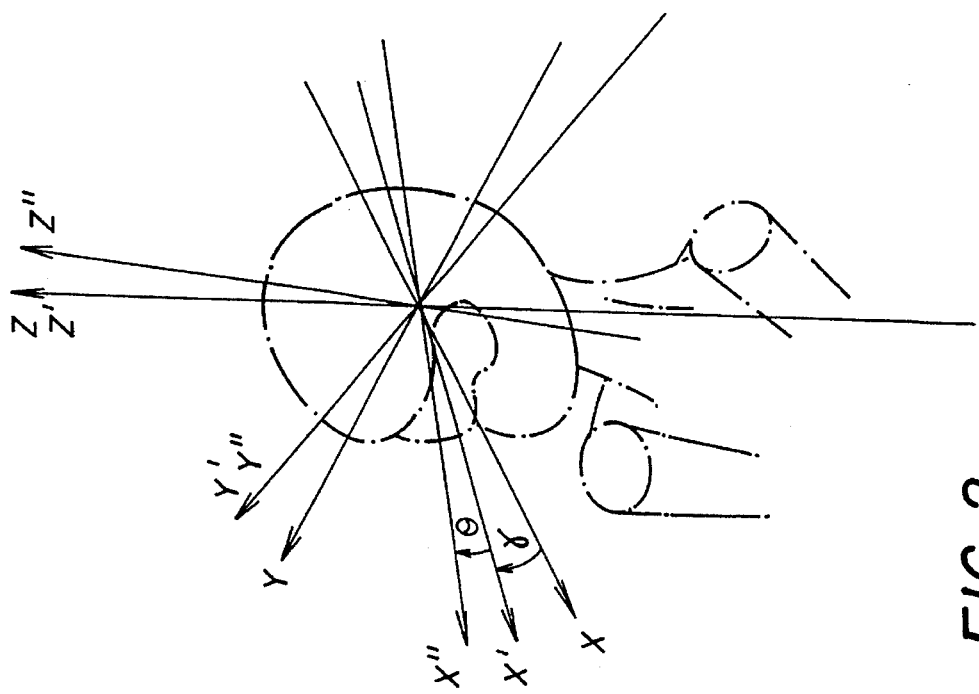
FIG. 2 is a schematic defining the angle $\theta$ and $\alpha$ in space.
Figure 3:
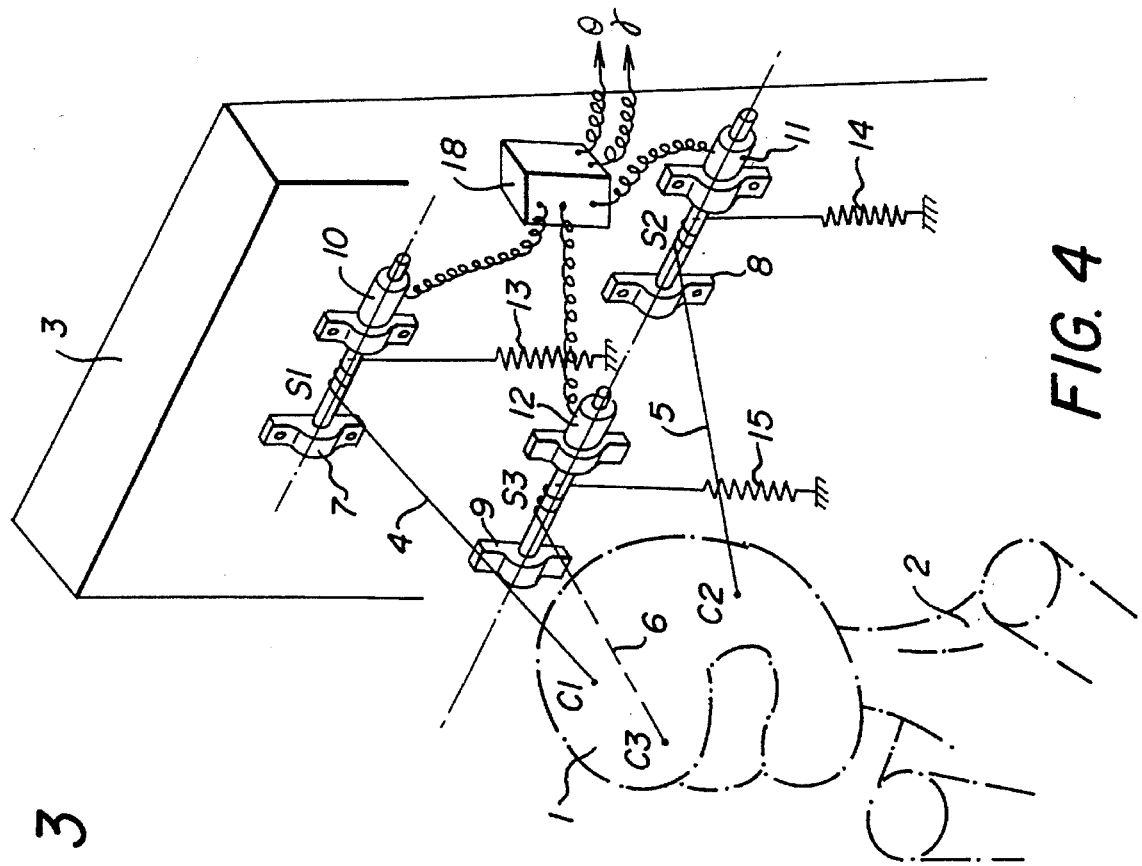
FIG. 3 is a schematic of a person wearing a helmet and sitting on a seat showing the four points C located on the helmet and the four points S located on the seat.

FIG. 3 shows another interesting application of the invention. In this case, four wires are linking the points C1, C2, C3 and C4 with the corresponding points S1, S2, S3 and S4. The introduction of a fourth wire enables to increase the precision and to compute an other parameter DY for example by using the following relations:

$$\theta = f(D, D2, D3, D4)$$

$$\alpha = f(D1, D2, D3, D4)$$

$$DX = f(D1, D2, D3, D4)$$

$$DY = f(D1, D2, D3, D4)$$

In this case, the wire are not necessarily parallel, and the mathematical expressions are more complex and define in an univocal way the values of the four desired parameters (here $\theta$, $\alpha$, DX, DY).

The above described example is described here as an indicative example. Many variations pursuant to the invention can be foreseen, and are part of this invention.

I claim:

1. Helmet positioning measure system, giving in real time the position of a helmet mounted on a person's head comprising the measurement of at least three distances (D1, D2, D3 . . . ) between at least three points (C1, C2, C3 . . . ) located on the helmet and at least three corresponding points (S1, S2, S3 . . . ) located on the seat or the cabin, the said points being positioned in space in such a way that at least two univocal relations exist:

$$\theta = f_\theta(D1, D2, D3, \ldots) \text{ and } \alpha = f_\alpha(D1, D2, D3, \ldots)$$

these two univocal relations leading to the computation of at least two values $\theta$ (pitch angle) and $\alpha$ (yaw angle) with a great precision about equal to or better than the milliradian.

2. The helmet positioning measurement system of claim 1 wherein the said points (C1, C2, C3 . . . ) and (S1, S2, S3 . . . ) are placed in such a way that the said univocal relations have the following expression:

$$\theta = f_\theta[D1, (D2+D3)]$$

and $$\alpha = f_\alpha[D1, (D2-D3)]$$

3. The helmet positioning measurement system of claim 1 wherein the said points (C1, C2, C3 . . . ) and (S1, S2, S3 . . . ) are placed in such a way that the said angles $\theta$ and $\alpha$ have the following two univocal relations:

$$\theta = f_\theta[D2, (D1+D3)] \text{ and } \alpha = f_\alpha[D2, (D1-D3)]$$

4. The helmet positioning measurement system of claim 1 wherein the number of said distances are chosen to be equal to 4 and are obtained between a set of 4 points (C1 to C4) located on the helmet and a set of 4 points (S1 to S4) located on the seat or the cabin, in such a way that at least the two parameters defining the position of helmet in roll and pitch are obtained by the following univocal relation:

$$\theta = f_\theta[D1, D2, D3, D4] \text{ and } \alpha = f_\alpha[D1, D2, D3, D4]$$

and $$DX = f_{DX}[D1, D2, D3, D4] \text{ and } DY = f_{DY}[D1, D2, D3, D4]$$

5. The helmet positioning measurement system of claim 4 wherein the said points C1 to C4 and S1 to S4 are located in such a way that two of the said univocal relations can be reduced to more simple particular relations:

$$\theta = f_{\theta S}[(D1-D4), (D3-D2)] \text{ and } \alpha = f_{\alpha S}[(D1-D4),(D3-D2)]$$

6. Helmet positioning measurement system, giving in real time the position of a helmet mounted on a person's head comprising the measurement of at least three distances (D1, D2, D3 . . . ) between at least three points (C1, C2, C3 . . . ) located on the helmet and at least three corresponding points (S1, S2, S3 . . . ) located on the seat or the cabin, the said points being positioned in space in such a way that at least two univocal relations exist:

$$\theta = f_\theta(D1, D2, D3, \ldots)$$

and $$\alpha = f_\alpha(D1, D2, D3, \ldots)$$

these two univocal relationships leading to the computation of at least two values $\theta$ (pitch angle) and $\alpha$ (yaw angle) with a great precision about equal to or better than the milliradian and wherein the said distances are measured by a length of a fine and light wire linking the points (C1, C2, C3 . . . ) located on the helmet and the corresponding points (S1, S2, S3 . . . ) located on the seat or the cabin, each wire being rolled up around a pulley having its axis of rotation fixed in relation with the seat or the cabin and creating a small tension on the wire, each pulley being connected to a rotation encoder measuring with great precision the angle of rotation of the pulley and therefor the length of wire between points C and S.

7. The helmet positioning measurement system of claim 6 wherein the said small tension of the wires is insured by a system selected among a group composed of: a spring or a small mass hanging down and connected to the end of the wire not attached to the helmet.

8. The helmet positioning measurement system of claim 6 wherein the said light wire comprises a safety device enabling the disconnection between the helmet and the seat or the cabin when the tension applied on the wire is greater than a predetermined value.

9. The helmet positioning measurement system of claim 6 wherein the wire has a preset length and is unwounded completely so that the wire is set free when the head is pulled far away from the seat or the cabin.

* * * * *